United States Patent [19]
Bassi et al.

[11] Patent Number: 5,977,312
[45] Date of Patent: Nov. 2, 1999

[54] MODIFIED WHEAT GLUTENS AND USE THEREOF IN FABRICATION OF FILMS

[75] Inventors: Sukh Bassi, Atchison, Kans.; Clodualdo C. Maningat, Platte City, Mo.; Rangaswamy Chinnaswamy; Li Nie, both of Kansas City, Mo.

[73] Assignee: Midwest Grain Products, Inc., Atchison, Kans.

[21] Appl. No.: 08/962,151

[22] Filed: Oct. 31, 1997

Related U.S. Application Data

[62] Division of application No. 08/614,373, Mar. 12, 1996, Pat. No. 5,747,648.

[51] Int. Cl.$^6$ .................... A61K 35/78; C07K 14/415; A23J 1/00; C04B 7/00
[52] U.S. Cl. .................... 530/374; 530/375; 426/656; 423/519; 106/649; 264/202
[58] Field of Search ........................ 106/649; 530/375, 530/374; 426/656; 423/519; 264/202

[56] References Cited

U.S. PATENT DOCUMENTS

| | | |
|---|---|---|
| 2,309,113 | 1/1943 | Huppert . |
| 2,861,061 | 11/1958 | Borel et al. . |
| 2,861,062 | 11/1958 | Borel et al. . |
| 3,615,715 | 10/1971 | Mullen . |
| 3,653,925 | 4/1972 | Anker et al. . |
| 4,167,503 | 9/1979 | Cipriani ................................ 260/33.2 |
| 4,645,831 | 2/1987 | Lawhon . |
| 4,935,257 | 6/1990 | Yajima . |
| 5,274,079 | 12/1993 | Katayama et al. . |
| 5,447,676 | 9/1995 | Fukuda et al. ...................... 264/331.18 |
| 5,472,511 | 12/1995 | Rayas et al. . |

FOREIGN PATENT DOCUMENTS

| | | |
|---|---|---|
| 24064 | 7/1971 | Japan . |
| 9414886 | 7/1994 | WIPO . |

OTHER PUBLICATIONS

Rayas et al.; Development and Characterization of Biodegradable/Edible Wheat Protein Films; J. Food Science, vol. 62, No. 1 (1997).
Krull et al.; Industrial Uses of Gluten; Cereal Science Today; vol. 16, No. 8 (1971).
Gennadios et al.; Modification of Physical and Barrier Properties of Edible Wheat Gulten–Based Films: Cereal Chem. 70(4):426–429.
Meester; Extraction et utillisation de la gliadine et de la glutenine due froment; 1/1974; Industries Alimentaires et Agricoles 91 Annee.
Goforth et al.; Separation of Glutenin from Gliaden by Ultracentrifugation; Cereal Chem.; 53(4) 608–612.
Gennadios et al.; Moisture Absorption by Grain Protein Films; Transactions of the ASAE; vol. 37(2):535–539.
Chem. Ab No. 121:257510z; Kawaguchi et al., Gluten sheets and manufacture thereof and cleaning tools using the same for dust pickup on contact.
Chem Ab No. 121:156095n; Gennadios et al., Water vapor permeability of wheat gluten and soy protein isolate films.
Chem Ab No. 120:219267x; Yashi et al.; Development of biodegradable gluten plastics.
Chem Ab No. 119:182230f; Makoto; Biodegradable plastics derived from poly(amino acids).
Chem Ab No. 119:74215w; Domae et al.; Gluten moldings and their manufacture.
Chem Ab No. 117:9072s; Domae et al.; Biodegradable plastics containing gluten.
Chem Ab No. 116:256890h; Yamashita; Development trends on biodegradable plastics.
Sato; Proteins of the soy bean and their industrial application; J. Chem. Ind. Tokyo 23, 1–25 (1920).
Sato; Proteins of the soy bean and their industrial application; J. Chem. Ind. (Japan) 23, 425–39 (1920).
Davies et al., Plasticisation and Mechanical Properties of Heat–Set Wheat Gluten; International Workshop on Gluten Proteins (1990;.
Chem Ab No. 121:281872q; Hasegawa et al; Biodegradable thermoplastic composition from corn gluten meal and its preparation.
Gennadios et al.; Edible Films and Coatings from Soymilk and Soy Protein; Cereal Foods World; 12/91; vol. 36, No. 12.
Yasui et al.; Development of biodegradable gluten plastic; Kobunshi Kako 1991, 40(8), 407–11.
Tolstoguzov; Thermoplastic Extrusion—The Mechanism of the Formation of Extrudate Structure and Properties; JAOCS, vol. 70, No. 4 (Apr. 1993).
Prudencio–Ferreira et al.; Protein–Protein Interactions in the Extrusion of Soya at Various TEmperatures and Moisture Contents; J. Food Science, vol. 58, No. 1993; 378–381.
Paetau et al.; Biodegradable Plastic Made from Soybean Products. 1. Effect of Preparation and Processing on Mechanincal Properties and Water Absorption; Ind. Eng. Chem. Res. 1994, 33, 1821–1827.
De Deken et al.; Wheat gluten. II. Action of reducing agents; Biochim. et Biophys. Acta 16, 566–9(1955).
Matsumoto; Breadmaking. XII. The mechanism of NaHSO$_3$ effect on gluten; J. Fermentation Technol. 33, 235–7. (1955).

(List continued on next page.)

*Primary Examiner*—Jeffrey Stucker
*Assistant Examiner*—Phuong T. Bui
*Attorney, Agent, or Firm*—Hovey, Williams, Timmons & Collins

[57] ABSTRACT

Wheat gluten protein-based biodegradable or edible films are produced using aqueous, essentially alcohol-free casting dispersions containing modified wheat protein and a plasticizer. The modified wheat protein is prepared by treating purified naturally occurring wheat protein with a reducing agent (e.g., sodium metabisulfite) in order to reduce the average molecular weight of the wheat protein and to cleave disulfide bonds therein. Such modified wheat gluten protein lowers the viscosity and allows increased solid contents in the casting dispersions, allowing fabrication of improved films.

13 Claims, 1 Drawing Sheet

OTHER PUBLICATIONS

Wada et al.; Studies on the production of artificial plastic masses from soybean protein; J. Soc. Chem. Ind., Japan 42, Suppl. binding 317–18 (1939).

Chem Ab No. 122:316010g; Kubota et al.; Biodegardable plastics obtained from water–soluble corn proteins.

Chem Ab No. 122: 263837y; Gontard; Edible wheat gluten films; optimization of the main process variables and improvement of water vapor barrier properties by combining gluten proteins with lipids.

Chem Ab No. 122:135036z; Nishiyama et al.; Investigation on research for degradable plastics.

Chem Ab No. 122:29919e–29926e; 17–Food, Feed Chem.; vol. 122, 1995.

Chem Ab No. 119:265990e; Ando; Biodegradable protein products for use as packaging material or container .

Chem Ab No. 119:119103b; Nagai et al.; Biodecomposable thermoplastic moldings and their manufacture.

Chem Ab No. 19008d; Anker et al.; Shaped articles by extruding nonthermally coagulable simple proteins.

Cherian et al.; Thermomechanical Behavior of Wheat Gluten Films: Effect of Sucrose, Glycerin and Sorbitol; 2 Cereal Chem.; vol. 72, No. 1, 1995.

Park et al.; Water Vapor Permeability and Mechanical Properties of Grain Protein–Based Films as Affected by Mixtures of Polyethylene Glycol and Glycerin Plasticizers; Transactions of the ASAE; vol. 37(4): 1281–1285 (1994).

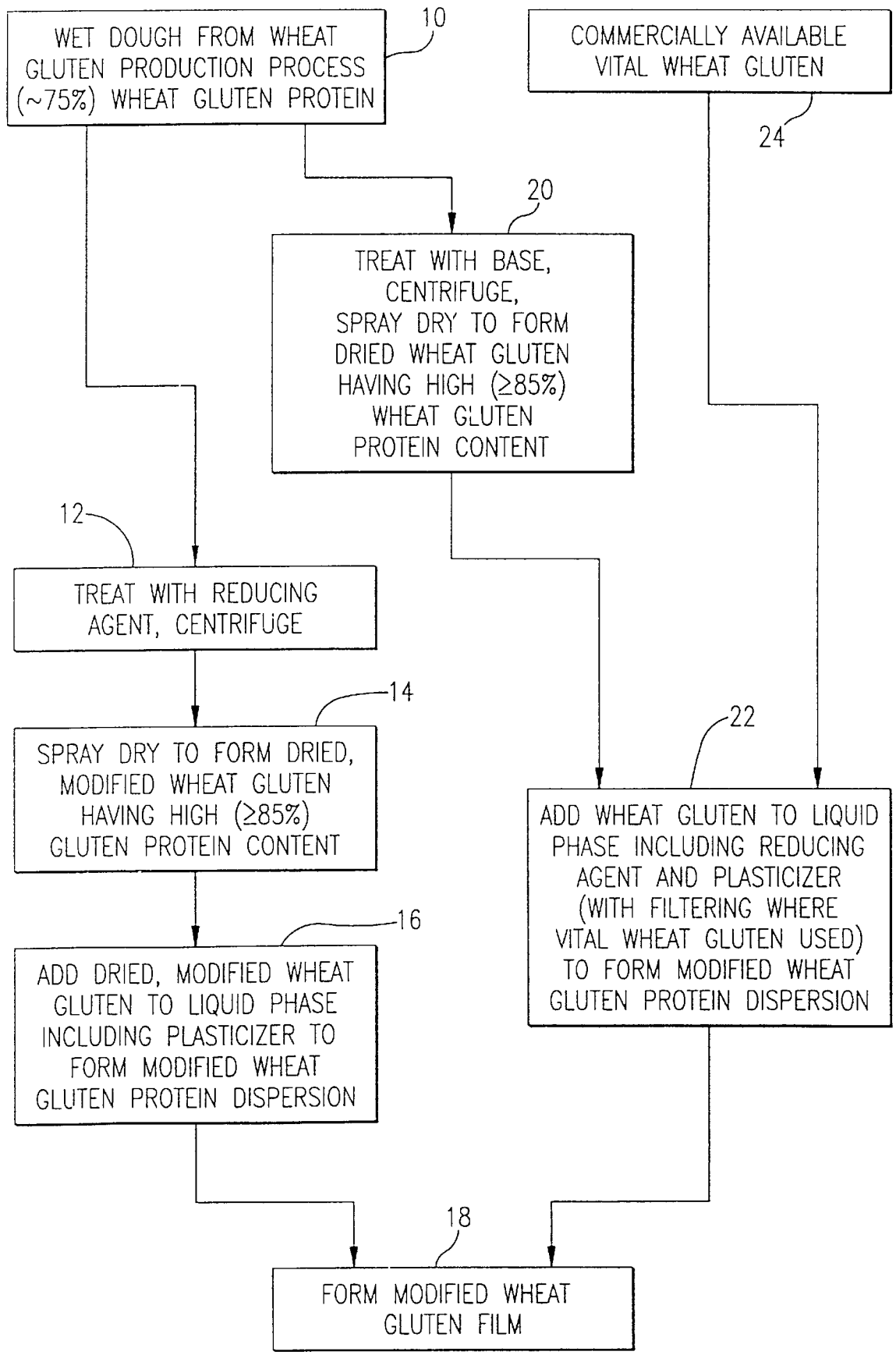

MODIFIED WHEAT GLUTENS AND USE THEREOF IN FABRICATION OF FILMS

This application is a division of application Ser. No. 08/614,373 filed Mar. 12, 1996, now U.S. Pat. No. 5,747,648.

BACKGROUND OF THE INVENTION

1. Field of the Invention

The present invention is broadly concerned with modified wheat glutens and dispersions which can be used in the casting of biodegradable and/or edible gluten-based films. More particularly, the invention pertains to such glutens, gluten products, dispersions and films, and methods of fabricating the same, wherein wheat gluten is modified with a reducing agent for cleaving of disulfide bonds therein under controlled conditions which prevent any substantial heat denaturation of the grain protein. Such modified wheat glutens can be used to fabricate superior films having good strength and thermal sealing properties.

2. Description of the Prior Art

Grain proteins, such as those derived from soy protein, or wheat or corn gluten, are commercially available and are relatively inexpensive in comparison to other biomaterials and many synthetic polymers. It has been suggested that such grain proteins and particularly the wheat glutens can be used to form flexible films by solution or dispersion casting, provided that the wheat glutens are used with appropriate plasticizers. Generally, it is understood that such films are insoluble in water and have good moisture permeability, but are deficient in oxygen permeability and tear strength.

In many film-forming prior procedures, the gluten-based casting solutions are prepared with alcohol and are heated to levels which substantially denature the gluten proteins and gelatinize the starch content of the solution. The use of alcohol solvents renders commercial-scale processing difficult and dangers owing to explosion hazards Heat denaturation of the gluten proteins lowers the ultimate strength of the films and the gelatinized starch further weakens the films and creates non-transparent films.

There is accordingly a real and unsatisfied need in the art for improved techniques and products for the fabrication of wheat gluten-based biodegradable and/or edible films which yields films having better physical properties while avoiding use of large quantities of alcohol as a part of film casting solutions or dispersions.

SUMMARY OF THE INVENTION

The present invention overcomes the problems outlined above, and provides enhanced modified wheat gluten, wheat gluten products and dispersions, and wheat gluten-based films having superior physical properties. Generally speaking, the improved products of the invention are based upon use of highly concentrated, substantially undenatured modified wheat gluten. Broadly, a starting wheat gluten material is treated with a reducing agent in order to lower the average molecular weight of the gluten proteins, and also to cleave in a controlled way a proportion of the disulfide bonds of the proteins. Such a modified wheat gluten product can be prepared and dried for later use. In such cases, the dried product is added to a liquid phase including a plasticizer to form a modified wheat gluten film casting dispersion. Alternately a casting dispersion can be made directly from starting wheat gluten by treatment with a reducing agent and addition of a plasticizer.

In film-forming procedures, the modified wheat gluten dispersions of the invention are layered onto a substrate and dried. Preferably, the film drying is done as a high temperature-short time operation. Final dried films in accordance with the invention have excellent tear strength and thermal sealing properties.

BRIEF DESCRIPTION OF THE DRAWING

The single drawing is a schematic flow diagram illustrating the preferred processing steps for obtaining modified wheat gluten products and dispersions, and wheat gluten-based films.

DETAILED DESCRIPTION OF THE PREFERRED EMBODIMENTS

Turning to the drawing, preferred processes in accordance with the invention are schematically set forth with particular reference to the use of wheat gluten as the starting material to produce modified wheat glutens, modified wheat gluten products and dispersions, and resulting wheat gluten films.

Referring to the drawing, a preferred process of the invention begins with provision of wheat gluten starting material 10. In the illustrated process, conventional wet dough from a wheat gluten production process may be used, having about 75% by weight wheat gluten. In order to provide the most suitable starting material for the formation of film-forming dispersions, the gluten dough in step 10 should be concentrated to achieve a gluten protein content of at least about 85% by weight, and more preferably from about 85–95% by weight. Advantageously, the concentrated wheat gluten material should have a maximum of about 10% by weight of naturally occurring brans, starches and other insolubles, and more preferably from about 0.1–8% by weight thereof. Generally, in order to obtain such high protein content, low insolubles wheat gluten, it is necessary to remove naturally occurring brans, starches and other insolubles from the commercially available wet dough.

In one aspect of the invention, the gluten starting material 10 is treated to form a modified gluten protein product which is dried and then used to form a casting dispersion. This exemplary process is illustrated in the drawing in steps 12–16, inclusive. In particular, in the first step 12 of this process, the high gluten protein starting material is treated with a reducing agent centrifuged to form a modified gluten protein product. The function of the reducing agent is to cleave disulfide bonds in the gluten protein, and to lower the average molecular weight thereof. Preferably, the modified gluten protein product has an average molecular weight of up to about 1000 kDa, and more preferably from about 50–900 kDa; moreover, the product should have at least about a 5% reduction in disulfide bonds as compared with the naturally occurring gluten protein in the gluten starting material, and more preferably from about a 25–100% reduction in disulfide bonds.

The reducing agents useful in the context of the invention are preferably taken from the group consisting of the alkali metal and ammonium sulfites, bisulfites, metabisulfites and nitrites, and mercaptoethanol, cysteine, cysteamine, and ascorbic acid; the alkali metal metabisulfites are most preferred. The amount of reducing agent used should be at a level of from about 0.05–20% by weight, based upon the weight of the wheat gluten protein in the wheat gluten starting material taken as 100% by weight. A more preferred range in this respect is from about 0.05–1% by weight on the same basis. In practice, the treatment of step 12 involves contacting the gluten starting material with an aqueous solution of reducing agent at ambient room temperature. The centrifugation step is conventional and is carried out in order to remove insoluble brans, starches and other insolubles and thereby increase the protein content of the starting dough.

Step 14 as illustrated in the drawing involves conventional spray drying the modified gluten protein product in order to yield a powder. Normally, this powder would have a maximum moisture content of about 10% by weight, more preferably up to about 7% by weight. The powder itself has an extended shelf life, and can be sold as a product of commerce to customers wishing to fabricate gluten-based films.

Referring to step 16, the dried modified gluten protein product is added to an aqueous, essentially alcohol-free liquid phase which includes a plasticizer in order to form a modified protein dispersion. In addition, the liquid phase would normally include a member selected from the group consisting of acids and bases for altering the pH of the liquid phase in order to promote the dispersion of the modified gluten protein therein. Optional ingredients can also be used in the liquid phase, for example, a release agent, colorant and defoamer.

In preferred forms, the plasticizer is selected from the group consisting of glycerol, diglycerol, propylene glycol, triethylene glycol, sorbital, mannitol, maltitol, hydrogenated starch syrup, polyvinyl alcohol, polyethylene glycol and mixtures thereof; glycerol is the most preferred plasticizer. In terms of levels of use, the plasticizer is employed in an amount sufficient to lower the glass transition temperature of the final film below about 25° C. Thus, the plasticizer is preferably present at a level of from about 20–40% by weight in the modified gluten protein dispersion, and more preferably from about 25–30% by weight. The water content of the modified gluten protein dispersions would be up to about 85% by weight and more preferably from about 75–80% by weight.

The pH adjusting agent is most preferably a base, with sodium hydroxide, potassium hydroxide and ammonia being most preferred. Generally, sufficient base should be added to adjust the pH of the modified gluten protein dispersions to a level of about 8–12, and most preferably from about 8.5–11.5. Such pH levels are usually achieved by using from about 1–15% by weight base, with the weight of the modified gluten protein taken as 100% by weight, and more preferably from about 1.5–10% by weight on this basis.

The release agent, if used, facilitates separation of a final film from a casting substrate. Generally, the release agent is selected from the group consisting of stearic acid and the stearate salts, e.g., sodium, potassium, magnesium and zinc stearates, as well as glycerol and sorbitol monostearates. A selected release agent would normally be used at a level of up to about 2% by weight, based upon the weight of the modified gluten protein taken as 100% by weight.

Defoamers if used are added to aid in the process of degassing of the modified gluten protein dispersion before casting thereof. Many commercially available defoamers can be used in minor amounts for this purpose, typically up to about 0.5% by weight, based upon the weight of the modified gluten protein taken as 100% by weight. Obviously, if edible films are desired, food grade defoamers would be used.

Colorants can be added to the modified gluten protein dispersion in order to give a desired color to the final films. The amount of colorant used is typically less than 1% by weight, based upon the weight of the modified gluten protein taken as 100% by weight.

In preparative procedures, it is important that the modified gluten protein dispersions be prepared without excessive heat in order to insure that the modified gluten protein content of the dispersions is not substantially heat denatured. To this end, the dispersions of the invention are preferably made with agitation but at a temperature below about 45° C., and most preferably below about 40° C. In this way, one can be assured that the modified gluten protein content of the dispersion is not rendered insoluble or otherwise unacceptably denatured.

As indicated, it is normally desirable to degas the modified gluten protein dispersions prior to casting. This is usually done under vacuum conditions so as to render the dispersions essentially free of entrained air bubbles.

The final modified gluten protein dispersions useful for direct film casting would normally have a viscosity of from about 100–5000 cps (Brookfield), and more preferably from about 500–4000 cps. Moreover, they would be maintained at relatively low temperatures, and preferably no more than about 45° C. In casting procedures as referred to in step 18, the prepared dispersions are layered by known means onto a substrate such as a stainless steel plate to achieve a substantially uniform thickness. The layers are then dried at a controlled temperature to give the final films. Preferably, the drying procedure should be carried out at relatively high temperatures and short drying times. For example, the drying temperature is preferably from about 60–99° C., with a drying time of up to about 10 minutes, and more preferably from about 1–5 minutes. The humidity conditions in the drying chamber should also be controlled, to achieve a relative humidity of from about 50–99%.

The wet gluten dough from step 10 may alternately be treated via steps 20–22 as shown in the drawing to form a modified gluten protein dispersion. In this process, the starting wet dough is initially treated with base and centrifuged followed by spray drying to form the desired concentrated dried wheat gluten having at least about 85% by weight wheat gluten protein content. Thereafter, the dried wheat gluten may be modified by adding it to a liquid phase including reducing agent and plasticizer to directly form the modified wheat gluten protein dispersion (step 22). In this instance, the dried wheat gluten is subjected to the reducing agent in the presence of the plasticizer so that the gluten is treated to reduce the average molecular weight thereof and to cleave disulfide bonds at the time the casting dispersion is formed. This dispersion can then be used to form the wheat gluten film in step 18 as indicated in the drawing.

Another alternate procedure depicted in the drawing involves direct formation of a modified gluten protein dispersion from commercially available vital wheat gluten (step 24). In such an alternative technique, the vital wheat gluten starting material is directly added to a liquid phase including at least a reducing agent and a plasticizer to directly form a modified gluten protein dispersion. Also, a filtering step is employed to reduce the content of the bran, starch and other insolubles and thereby elevate the wheat gluten protein content of the dispersion. In this case, the amounts and preparative procedures described previously in connection with the first method of preparation are followed. Similarly, once a modified gluten protein dispersion is formed in step 22, the casting thereof in step 18 is carried out exactly as described.

Final gluten films in accordance with the invention have very desirable strength and thermal sealing abilities. Moreover, the films hereof can be readily controlled in terms of color and opacity. As indicated above, the modified gluten protein content of the casting dispersions are subjected to disulfide cleavage owing to the treatment with reducing agent. It is to be understood however, that the film drying process serves to reform many of these disulfide bonds to increase the tear strength of the final films. In this connection, the gluten-based films of the invention comprise a matrix of modified gluten protein and a plasticizer. It is believed that the modified gluten protein present in the final films is somewhat different than that present in the casting dispersions. As indicated previously, the plasticizer is present in the final film in an amount to lower the glass transition temperature thereof to below about 25° C. This translates to a plasticizer content of the films of from about 20–40% by weight, and more preferably from about 25–30% by weight. The final moisture content of the films of the invention would be up to about 15% by weight, and more preferably from about 5–10% by weight.

The other ingredients would include the release agent and colorant. The release agent would normally be present at a level of up to about 2% by weight, based upon the weight of the modified gluten protein content of the films taken as 100% by weight. The colorant will of course be present at a level necessary to give a desired color.

Although the films can be of variable thickness, normally they have a thickness of up to about 50 mils and more preferably from about 2.5–40 mils.

The following examples set forth presently preferred techniques for the preparation of modified wheat gluten protein products, modified gluten protein dispersions, and resultant gluten-based films. It should be understood in this respect that the examples are provided by way of illustration only, and nothing therein should be taken as a limitation upon the overall scope of the invention.

EXAMPLE 1

Seventy-five parts by weight of wheat gluten isolate (Midwest Grain Products, Inc.) was blended with 25 parts by weight food grade glycerol (99%, Sigma Chemical Co.) using a Hobart mixer. The mixed sample was gradually transferred to a homogenizing tank containing 347 parts by weight water, 0.15 parts by weight sodium metabisulfite, 1.5 parts by weight sodium hydroxide, 0.45 parts by weight potassium stearate and 0.9 parts by weight Mazu DF203 defoamer (PPG Industries, Inc.). Creation of the modified gluten protein dispersion took about 10 minutes and the final dispersion temperature was 25° C. Thereafter, the modified gluten protein dispersion was degassed under vacuum to give a viscous dispersion essentially free of air bubbles.

The complete modified gluten protein dispersion was then applied onto a stainless steel plate using a film applicator to give a film thickness of about 3 mils. The applied film was then dried for about 3 minutes in a closed oven at a constant temperature of 90° C. The dried film was then readily peeled from the plate.

EXAMPLE 2

The process of Example 1 was repeated, except vital wheat gluten (approximately 75% by weight wheat gluten protein) is used instead of wheat gluten isolate. Prior to degassing, the modified gluten protein dispersion was pressure filtered to remove bran, starch and other soluble materials.

EXAMPLE 3

A dried modified high protein wheat gluten product was prepared by purification of wet gluten dough from a commercial gluten production process (Midwest Grain Products, Inc.). Wet gluten dough containing 100 parts by weight gluten solids was dispersed in a 1% ammonia solution to give a solids content of 14% by weight. 0.5 parts by weight sodium metabisulfite was then added to the ammonia-gluten dispersion. After 5 minutes set time, the ammonia-gluten dispersion was centrifuged to remove most of the insolubles. The purified modified gluten protein product was then spray dried to give a dried modified gluten protein product having a protein content of about 90% by weight, dry basis.

The dried modified gluten protein product was then dispersed in a liquid phase for film production. In particular, 75 parts by weight of the dried modified gluten protein product were mixed with 25 parts by weight food grade glycerol in a Hobart mixer. The mixed sample was transferred to a homogenizing tank containing 347 parts by weight water, 1.5 parts by weight sodium hydroxide, 0.6 parts by weight stearic acid and 0.9 parts by weight Mazu DF203 defoamer to create a modified gluten protein dispersion. The dispersion took about 10 minutes to form. The dispersion temperature was maintained throughout at about 25° C. After formation of the modified gluten protein dispersion, it was degassed under vacuum to give a viscous dispersion essentially free of air bubbles. The modified gluten protein dispersion was then applied to a stainless steel plate with a film applicator to give a layer which resulted in a final film thickness of 3 mils. The layer was dried in a closed oven with a control temperature of 90° C. over a period of about 3 minutes. The dried film was readily peeled from the plate.

EXAMPLE 4

The process of Example 1 was repeated except that the modified gluten protein dispersion was formulated using 7.5 parts by weight ammonia in lieu of sodium hydroxide.

While the foregoing examples have described film formation using a laboratory apparatus, it is believed that excellent films can be formed using conventional, commercial scale film forming equipment.

We claim:

1. A wheat gluten protein-based film comprising a matrix of wheat gluten protein, water and plasticizer, said modified wheat gluten protein made from naturally occurring wheat gluten protein modified by a reducing agent, said modified wheat gluten protein comprising gliadin and glutenin fractions, having at least a 5% reduction in disulfide bonds as compared with said naturally occurring grain protein, having substantially no heat denaturation, and having an average molecular weight of up to 1000 kDa, said plasticizer being present in an amount sufficient to lower the glass transition temperature of the film to below 25° C.

2. The film of claim 1, said modified wheat gluten protein being present at a level of 70–80% by weight.

3. The film of claim 1, said modified wheat gluten protein having a 25–100% reduction in said disulfide bonds.

4. The film of claim 1, said plasticizer being present at a level of 20–30% by weight.

5. The film of claim 1, said plasticizer being selected from the group consisting of glycerol, diglycerol, propylene glycol, triethylene glycol, sorbital, mannitol, maltitol, hydrogenated starch syrup, polyvinyl alcohol, polyethylene glycol and mixtures thereof.

6. The film of claim 1, said plasticizer being glycerol.

7. The film of claim 1, said film having a thickness of at most 50 mils.

8. The film of claim 7, said thickness being 0.5–40 mils.

9. The film of claim 1, including a release agent.

10. The film of claim 9, said release agent being selected from the group consisting of stearic acid and stearate salts.

11. The film of claim 9, said release agent being present at a level of at most 2% by weight, based upon the weight of said modified grain protein taken as 100% by weight.

12. The film of claim 1, including a colorant.

13. The film of claim 1, said film after drying having a maximum moisture content of at most 15% by weight.

* * * * *